United States Patent Office 2,936,319
Patented May 10, 1960

2,936,319
WATER-INSOLUBLE STYRYL DYESTUFFS
Ernest Merian, Bottmingen, Bruno J. R. Nicolaus, Basel, and Otto Senn, Arlesheim, Switzerland, assignors to Sandoz A.G., Basel, Switzerland
No Drawing. Application July 12, 1957
Serial No. 671,419
Claims priority, application Switzerland August 3, 1956
7 Claims. (Cl. 260—465)

The present invention relates to new water-insoluble styryl dyestuffs which possess the general formula

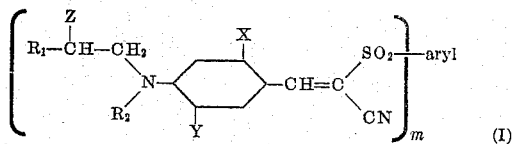

wherein $R_1$ denotes chlorine, bromine, or the $R_3$—CO—O radical in which $R_3$ stands for a methyl, chloromethyl, ethyl, n-propyl, isopropyl, methoxymethyl or ethoxymethyl radical, $R_2$ an alkyl radical with 1 to 4 carbon atoms or, when $R_1$ stands for the $R_3$—CO—O radical, also the

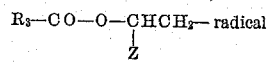

X a methyl or ethyl radical,
Y hydrogen, a methyl, ethyl, methoxy or ethoxy radical,
Z hydrogen or a methyl radical, and
m the number 1 or 2.

Especially valuable water-insoluble styryl dyestuffs are those which correspond to the Formula I,
wherein
m is the number 1,
X denotes a methyl group,
Y a hydrogen atom,
Z a hydrogen atom or a methyl group,
$R_1$ a chlorine atom, an acetoxy, a chloroacetoxy or a propionoxy radical, and
$R_2$, when $R_1$ is a chlorine atom, an ethyl group, and when $R_1$ is an acetoxy, a chloroacetoxy or a propionoxy radical, an ethyl group or a group

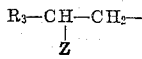

in which $R_3$ is the same alkanoyloxy radical as $R_1$.

The process for the production of the new water-insoluble styryl dyestuffs consists in condensing 1 or 2 mols of an aldehyde free from water-solubilizing groups and having the formula

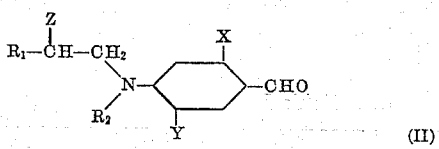

wherein $R_1$, $R_2$, X, Y and Z possess the aforementioned meanings with 1 mol of an active methylene compound of the formula $$aryl\text{-}(SO_2\text{—}CH_2\text{—}CN)_m \qquad (III)$$

wherein m represents the figure 1 or 2. The process is a further feature of the invention.

The reaction of the aldehyde with the active methylene compound is performed advantageously by causing the aldehyde to act upon the said compound at elevated temperature in homogeneous solution in a suitable solvent and in presence of a small quantity of a basic substance, e.g. ammonia, dimethylamine, diethylamine or piperidine. It is also possible to heat a mixture of the above-mentioned reactants in presence of glacial acetic acid or another organic acid plus a proton acceptor such as ammonia, diethylamine, dimethylamine or piperidine in a hydrocarbon like benzene, toluene, xylene, or chloroform or carbon tetrachloride, the organic solvent acting as a recycling agent. The water of reaction is continuously drained off so that there is a constant shift in the equilibrium position to the side of the condensation product.

Condensation can also be conducted by saturating a homogeneous solution of the two reactants in a suitable solvent with dry hydrogen chloride. This procedure gives rise to a hydrogen chloride addition product, which upon distilling or heating with tertiary bases such as dimethylaniline or diethylaniline, splits off the hydrogen chloride to yield the desired ethylidene compound.

Finally, condensation can be carried out by melting together the reactants and a basic catalyst such at ammonia, dimethylamine, diethylamine, piperidine, ammonium acetate or piperidine acetate in the absence of solvent.

The dyestuffs are isolated by one of the common basic operations, e.g. filtration, evaporation of the solvent or precipitation from the solvent with a suitable precipitating agent.

The new styryl dyestuffs possess a clearly defined absorption band in the visible region and are characterized by an excellent color yield and also by their brilliancy of shade.

They may be applied singly or in combination with other dyestuffs of the same composition for the mass pigmentation of oils, lacquer media, moulding resins and other plastics, and solutions of textile fibers which are subsequently extruded as filament.

One field of application, for example, is the mass or dope dyeing of secondary cellulose acetate and triacetate in greenish yellow to neutral yellow shades. The spun-dyed filament exhibits very good fastness to light, washing, water, perspiration, cross-dyeing, crocking, ironing, sublimation, chlorine in alkaline medium, hydrosulfite, gas fumes, and oxalic acid, and withstand dry cleaning and peroxide bleaching.

Furthermore a certain number of the new dyestuffs are suitable for dyeing synthetic fibers in the melt prior to spinning, a process employed for the synthetic polyamide and polyester fibers. In this connection it may be noted that almost all of the azo dyestuffs are destroyed under the temperature conditions obtaining in this process.

In the examples which follow all the specified weights and percentages are by weight. The temperatures are in degrees centigrade and the melting points are uncorrected.

EXAMPLE 1

33.5 parts of 1-(N-dipropionyloxyethyl)-amino-3-methyl-4-benzaldehyde with 19.5 parts of (4-methylphenyl-1-sulfonyl)-acetonitrile and 1 part of piperidine in 50 parts of methyl alcohol are heated to the boil with reflux.

At this point the mass takes on a deep yellow color. After some time it is cooled to 0°, upon which the new styryl dyestuff crystallizes out in beautiful yellow needles. It is filtered off, washed with cold alcohol and dried. The dyestuff is very soluble in acetone and melts at 88°. Applied in spinning solutions of secondary cellulose acetate, it yields brilliant greenish yellow shades which have very good fastness properties.

100 parts of secondary cellulose acetate are dissolved in 300 parts of a mixture of acetone and methanol in the ratio 93:7. The mass is mixed for a short time and left overnight to swell. 0.5 part of the styryl dyestuff obtained according to Example 1 is dissolved in 85 parts of the same solvent mixture by simple shaking. This solution is added to the cellulose acetate solution and the whole is stirred in an open vessel until 60 parts of the solvent have evaporated. The dyed mass is then pumped into the spinning pot in the normal way and spun. The filament is dyed a greenish yellow; the dyeings show good all-round fastness.

The aldehyde used as starting material is produced in the following way:

44 parts of N,N-dimethylformamide, 120 parts of phosphorus oxychloride, 30 parts of chlorobenzene and 30.7 parts of 1-(N-dipropionyloxyethyl)-amino-3-methylbenzene are stirred for 12 hours at 60°. As soon as the reaction is completed the reaction mass is poured onto a mixture of 300 parts of ice and 300 parts of water with thorough stirring. The resultant suspension is adjusted to pH 6 by the addition of a 5% sodium hydroxide solution. After some time the chlorobenzene layer is separated and is boiled down in vacuo. The aldehyde is a light-colored oil which congeals in a short time.

EXAMPLE 2

When the same amount of the aldehyde employed in Example 1 is condensed with 25 parts of (3.4-dichlorophenyl-1-sulfonyl)-acetonitrile, a yellow dyestuff whose melting point is 125°, is obtained.

200 parts of cellulose triacetate, 5 parts of the dyestuff obtained as in Example 2, 927 parts of methylene chloride and 49 parts of ethanol are compounded to a homogeneous mass. This is pumped into the spinning pot and spun by the normal method. The spun filament is dyed to a bright greenish yellow shade which possesses excellent fastness properties.

The (3.4-dichlorophenyl-1-sulfonyl)-acetonitrile is new and is obtained in the following manner:

23.3 parts of sodium 3.4-dichlorobenzene-1-sulfinate, 80 parts of water and 10 parts of chloroacetamide are stirred for 1 hour at 90°. The reaction product is filtered off and dried thoroughly. It is then fed into 60 parts of phosphorus oxychloride and the reaction mass stirred for 3 hours at 95°. On completion of the reaction it is loaded upon ice water, filtered off, and washed until the filtrate reacts neutral. The dried crude product melts at 102–103°.

EXAMPLE 3

22.5 parts of a technical mixture of 1-(N-ethyl-N-chloroethyl)-amino-3-methyl-4-benzaldehyde and 1-(N,N-diethyl)-amino-3-methyl-4-benzaldehyde together with 20 parts of 4-methylbenzene-1-sulfonylacetonitrile and 1 part of piperidine in 30 parts of ethanol are heated to the boil with reflux. The mass is deep yellow in color at this stage. It is maintained at the boil for 24 hours and then allowed to cool whereupon the new styryl dyestuff crystallizes out. It is filtered off, washed with water and dried. In the crude state it melts at 168–173°; it is readily soluble in acetone.

A solution composed of 400 parts of polyethylene, 4 parts of the dyestuff obtained as described in the foregoing paragraph and 600 parts of xylene is extruded through the 0.5 mm. diameter orifice of a spinning nozzle into mixtures of butyl alcohol and butyl phthalate. The greenish yellow filaments formed by precipitation are washed in petroleum ether and dried in a warm atmosphere.

The mixture of 1-(N-ethyl-N-chloroethyl)-amino-3-methyl-4-benzaldehyde and 1-(N,N-diethyl)-amino-3-methyl-4-benzaldehyde used as starting product is produced by treating 180 parts of a technical mixture of 1-(N-ethyl-N-hydroxyethyl)-amino-3-methylbenzene and 1-(N,N-diethyl)-amino-3-methylbenzene with 460 parts of phosphorus oxychloride and 270 parts of N-methyl-N-formyl-aminobenzene for 16 hours at 45°. The crude aldehyde mixture thus obtained melts at 41–47°.

EXAMPLE 4

Upon replacement of the 22.5 parts of the aldehyde mixture used in Example 3 by 22.5 parts of pure 1-(N-ethyl-N-chloroethyl)-amino-3-methyl-4-benzaldehyde, the styryl dyestuff, which is obtained in a purer form, melts at 180°, upon recrystallization from ethanol.

EXAMPLE 5

22.5 parts of pure 1-(N-ethyl-N-chloroethyl)-amino-3-methyl-4-benzaldehyde are mixed with 20 parts of 4-methylbenzene-1-sulfonylacetonitrile at 50–60° to give a homogeneous paste. 1 part of piperidine is added to the paste and the temperature of the mass is raised to 100° with constant stirring. After some time the reaction is completed. The deep yellow colored mass is poured while still hot onto a sheet of stainless steel and allowed to congeal. The crude styryl dyestuff is then finely ground. It melts at 167–173° and is readily soluble in acetone.

1 part of the dyestuff obtainable according to Example 5 and 150 parts of polyvinyl chloride are dissolved in 849 parts of cyclohexanone at 80°. The hot solution is subsequently extruded into a bath of 500 parts of cyclohexanone and 9500 parts of 2-ethylhexanone, where it is precipitated to form a green-yellow filament which is reeled, dried under tension, and orientated.

In the following Table 1 valuable styryl dyestuffs are described which can be produced by the process disclosed in the foregoing. They correspond to the general formula

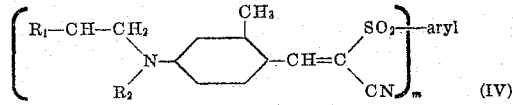
(IV)

The meanings of $R_1$, $R_2$, $m$ and aryl are given under the appropriate column headings. A further column contains the melting points of the new styryl dyestuffs. The penultimate and end columns respectively give information on the solubility of the dyestuffs in acetone, expressed in grams per liter, and the shade of the spun-dyed cellulose acetate filament.

*Table 1*

| Ex. No. | $R_1$ | $R_2$ | aryl | $m$ | M.P., degrees | Solubility in acetone, g. per l. | Shade in Spun-Dyed Cellulose Acetate |
|---|---|---|---|---|---|---|---|
| 6 | chlorine | ethyl | phenyl | 1 | 173 | 30 | greenish yellow. |
| 7 | do | do | 5,6,7,8-tetrahydronaphthyl-2 | 1 | 136 | 100 | Do. |
| 8 | do | do | 2-methyl-5-isopropylphenyl-1 | 1 | 113 | 100 | Do. |
| 9 | do | do | 3,4-dichlorophenyl-1 | 1 | 161 | 30 | Do. |
| 10 | acetoxy | acetoxy ethyl | 4-methylphenyl-1 | 1 | 175 | 66 | Do. |
| 11 | propionoxy | propionoxyethyl | naphthyl-2 | 1 | 126 | 100 | Do. |
| 12 | do | do | 4,4'-diphenylen-1,1' | 2 | 136 | 44 | Do. |
| 13 | do | do | naphthyl-1,5 | 2 | 126 | 200 | Do. |
| 14 | do | do | naphthyl-2,6 | 2 | 246 | 10 | Do. |

Further valuable styryl dyestuffs of the formula

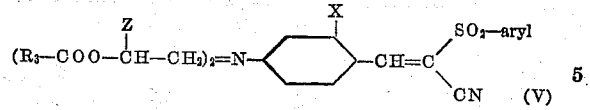

are listed in Table 2; they are characterized by the symbols $R_3$, Z, X and aryl in columns (I) to (IV) and by the shade in spun dyed cellulose acetate in column (V).

Table 3 contains new styryl dyestuffs corresponding to the formula

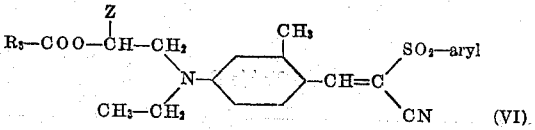

They are characterized by the symbols $R_3$, Z and aryl

*Table 2*

| Ex. No. | (I) $R_3$ | (II) Z | (III) X | (IV) aryl | (V) Shade in spun-dyed cellulose acetate |
|---|---|---|---|---|---|
| 15 | ethyl | hydrogen | methyl | phenyl | greenish yellow. |
| 16 | do | do | do | 4-ethylphenyl-1 | Do. |
| 17 | do | do | do | 4-isopropylphenyl-1 | Do. |
| 18 | do | do | do | 4-tert.butylphenyl-1 | Do. |
| 19 | do | do | do | 3.4-dimethylphenyl-1 | Do. |
| 20 | do | do | do | 4-chlorophenyl-1 | Do. |
| 21 | do | do | do | 4-bromophenyl-1 | Do. |
| 22 | do | do | do | 4-fluorophenyl-1 | Do. |
| 23 | do | do | do | naphthyl-1 | Do. |
| 24 | do | do | do | 5.6.7.8-tetrahydronaphthyl-2. | Do. |
| 25 | do | do | do | 5.6.7.8-tetrahydronaphthyl-1. | Do. |
| 26 | do | do | do | 4-tert.amylphenyl-1 | Do. |
| 27 | do | do | ethyl | phenyl | Do. |
| 28 | methyl | do | methyl | do | Do. |
| 29 | do | do | do | 4-chlorophenyl-1 | Do. |
| 30 | do | do | do | 3.4-dimethylphenyl-1 | Do. |
| 31 | do | do | do | naphthyl-2 | Do. |
| 32 | n-propyl | do | do | phenyl | Do. |
| 33 | do | do | do | 4-methylphenyl-1 | Do. |
| 34 | do | do | do | 4-tert.butylphenyl-1 | Do. |
| 35 | do | do | do | naphthyl-1 | Do. |
| 36 | do | do | do | 4-chlorophenyl-1 | Do. |
| 37 | methoxymethyl | do | do | do | Do. |
| 38 | do | do | do | phenyl | Do. |
| 39 | do | do | do | 5.6.7.8-tetrahydronaphthyl-2. | Do. |
| 40 | do | do | do | 4-methylphenyl-1 | Do. |
| 41 | ethoxymethyl | do | do | do | Do. |
| 42 | do | do | do | phenyl | Do. |
| 43 | do | do | do | 4-chlorophenyl-1 | Do. |
| 44 | do | do | do | 4-ethylphenyl-1 | Do. |
| 45 | chloromethyl | do | do | phenyl | Do. |
| 46 | do | do | do | 4-isopropylphenyl-1 | Do. |
| 47 | do | do | do | 4-bromophenyl-1 | Do. |
| 48 | do | do | do | 4-chlorophenyl-1 | Do. |
| 49 | do | do | do | 4-methylphenyl-1 | Do. |
| 50 | methyl | methyl | do | do | Do. |
| 51 | do | do | do | phenyl | Do. |
| 52 | do | do | do | 3.4-dichlorophenyl-1 | Do. |
| 53 | do | do | do | 4-chlorophenyl-1 | Do. |
| 54 | ethyl | do | do | do | Do. |
| 55 | do | do | do | phenyl | Do. |
| 56 | do | do | do | 4-methylphenyl-1 | Do. |
| 57 | do | do | do | 3.4-dimethylphenyl-1 | Do. |
| 58 | do | do | do | 4-ethylphenyl-1 | Do. |
| 59 | do | do | do | 4-isopropylphenyl-1 | Do. |
| 60 | do | do | do | 4-tert.butylphenyl-1 | Do. |
| 61 | do | do | do | 4-tert.amylphenyl-1 | Do. |
| 62 | do | do | do | 4-bromophenyl-1 | Do. |
| 63 | do | do | do | 4-fluorophenyl-1 | Do. |
| 64 | do | do | do | naphthyl-2 | Do. |
| 65 | do | do | do | 5.6.7.8-tetrahydronaphthyl-2. | Do. |
| 66 | do | do | do | 5.6.7.8-tetrahydronaphthyl-1. | Do. |
| 67 | do | do | do | naphthyl-1 | Do. |
| 68 | do | do | do | 3.4-dichlorophenyl-1 | Do. |
| 69 | do | do | ethyl | phenyl | Do. |
| 70 | n-propyl | do | methyl | do | Do. |
| 71 | do | do | do | 4-methylphenyl-1 | Do. |
| 72 | do | do | do | 4-chlorophenyl-1 | Do. |
| 73 | methoxymethyl | do | do | do | Do. |
| 74 | do | do | do | naphthyl-2 | Do. |
| 75 | do | do | do | phenyl | Do. |
| 76 | do | do | do | 4-methylphenyl-1 | Do. |
| 77 | ethoxymethyl | do | do | do | Do. |
| 78 | do | do | do | phenyl | Do. |
| 79 | do | do | do | 3.4-dichlorophenyl-1 | Do. |
| 80 | do | do | do | 4-chlorophenyl-1 | Do. |
| 81 | chloromethyl | do | do | do | Do. |
| 82 | do | do | do | phenyl | Do. |
| 83 | do | do | do | 4-methylphenyl-1 | Do. |
| 84 | do | do | do | 4-isopropylphenyl-1 | Do. |
| 85 | isopropyl | do | do | phenyl | Do. |
| 86 | do | do | do | 4-methylphenyl-1 | Do. |
| 87 | do | hydrogen | do | do | Do. | in columns (I) to (III) and by the shade of spun-dyed cellulose acetate in column (IV).

Table 3

| Ex. No. | (I) R₂ | (II) Z | (III) aryl | (IV) Spun-Dyed Cellulose Acetate |
|---|---|---|---|---|
| 88 | ethyl | hydrogen | phenyl | greenish yellow |
| 89 | do | do | 4-methylphenyl-1 | Do. |
| 90 | do | do | 4-ethylphenyl-1 | Do. |
| 91 | do | do | 3.4-dimethylphenyl-1 | Do. |
| 92 | do | do | 4-isopropylphenyl-1 | Do. |
| 93 | do | do | 4-tert.butylphenyl-1 | Do. |
| 94 | do | do | 4-chlorophenyl-1 | Do. |
| 95 | do | do | 4-bromophenyl-1 | Do. |
| 96 | do | do | naphthyl-2 | Do. |
| 97 | do | do | 5.6.7.8.-tetrahydronaphthyl-2 | Do. |
| 98 | methyl | do | 5.6.7.8.-tetrahydronaphthyl-1 | Do. |
| 99 | do | do | phenyl | Do. |
| 100 | do | do | 4-methylphenyl-1 | Do. |
| 101 | ethyl | do | 4-fluorophenyl-1 | Do. |
| 102 | do | do | 4-chlorophenyl-1 | Do. |
| 103 | do | do | 4-tert.amylphenyl-1 | Do. |
| 104 | n-propyl | do | phenyl | Do. |
| 105 | do | do | naphthyl-1 | Do. |
| 106 | do | do | 4-chlorophenyl-1 | Do. |
| 107 | do | do | 4-methylphenyl-1 | Do. |
| 108 | chloromethyl | do | phenyl | Do. |
| 109 | do | do | 4-methylphenyl-1 | Do. |
| 110 | do | do | 4-ethylphenyl-1 | Do. |
| 111 | do | do | 4-chlorophenyl-1 | Do. |
| 112 | methoxymethyl | do | do | Do. |
| 113 | do | do | phenyl | Do. |
| 114 | do | do | 4-isopropylphenyl-1 | Do. |
| 115 | do | do | 4-methylphenyl-1 | Do. |
| 116 | ethoxymethyl | do | do | Do. |
| 117 | do | do | phenyl | Do. |
| 118 | do | do | naphthyl-2 | Do. |
| 119 | do | do | 4-chlorophenyl-1 | Do. |
| 120 | do | methyl | do | Do. |
| 121 | do | do | phenyl | Do. |
| 122 | do | do | 4-methylphenyl-1 | Do. |
| 123 | methoxymethyl | do | do | Do. |
| 124 | do | do | phenyl | Do. |
| 125 | do | do | 4-chlorophenyl-1 | Do. |
| 126 | chloroethyl | do | do | Do. |
| 127 | do | do | 4-methylphenyl-1 | Do. |
| 128 | do | do | phenyl | Do. |
| 129 | methyl | do | do | Do. |
| 130 | do | do | 4-methylphenyl-1 | Do. |
| 131 | do | do | 4-tert.butylphenyl-1 | Do. |
| 132 | do | do | 4-chlorophenyl-1 | Do. |
| 133 | ethyl | do | do | Do. |
| 134 | do | do | phenyl | Do. |
| 135 | do | do | 4-methylphenyl-1 | Do. |
| 136 | do | do | 4-ethylphenyl-1 | Do. |
| 137 | do | do | 4-isopropylphenyl-1 | Do. |
| 138 | do | do | 4-tert.butylphenyl-1 | Do. |
| 139 | do | do | 3.4-dimethylphenyl-1 | Do. |
| 140 | do | do | naphthyl-2 | Do. |
| 141 | do | do | 5.6.7.8.-tetrahydronaphthyl-2 | Do. |
| 142 | n-propyl | do | 3.4-dichlorophenyl-1 | Do. |
| 143 | do | do | phenyl | Do. |
| 144 | do | do | 4-chlorophenyl-1 | Do. |
| 145 | do | do | 4-methylphenyl-1 | Do. |
| 146 | isopropyl | do | do | Do. |
| 147 | do | do | 4-chlorophenyl-1 | Do. |
| 148 | do | do | phenyl | Do. |
| 149 | do | hydrogen | do | Do. |

Table 4 sets forth styryl dyestuffs which correspond to the formula

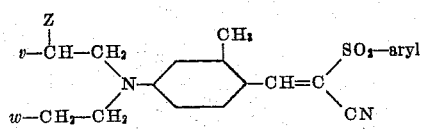

(VII)

and are characterized by the symbols $v$, $Z$, $w$ and aryl in columns (I) to (IV) and by the shade of spun-dyed cellulose acetate in column (V).

Table 4

| Ex. No. | (I) v | (II) Z | (III) w | (IV) aryl | (V) Shade of Spun-Dyed Cellulose Acetate |
|---|---|---|---|---|---|
| 150 | chlorine | hydrogen | hydrogen | 3.4-dimethylphenyl-1 | greenish yellow |
| 151 | do | do | do | 4-ethylphenyl-1 | Do. |
| 152 | do | do | do | 4-isopropylphenyl-1 | Do. |
| 153 | do | do | do | 4-tert. butylphenyl-1 | Do. |
| 154 | do | do | do | 4-chlorophenyl-1 | Do. |
| 155 | do | do | do | 4-fluorophenyl-1 | Do. |
| 156 | do | do | do | 4-bromophenyl-1 | Do. |
| 157 | do | do | do | naphthyl-2 | Do. |
| 158 | do | methyl | do | 5.6.7.8-tetrahydronaphthyl-2 | Do. |
| 159 | do | do | do | naphthyl-2 | Do. |
| 160 | do | do | do | phenyl | Do. |
| 161 | do | do | do | 4-methylphenyl-1 | Do. |
| 162 | do | do | do | 3.4-dimethylphenyl-1 | Do. |
| 163 | do | do | do | 4-ethylphenyl-1 | Do. |
| 164 | do | do | do | 4-isopropylphenyl-1 | Do. |
| 165 | do | do | do | 4-tert. butylphenyl-1 | Do. |
| 166 | do | do | do | 4-tert. amylphenyl-1 | Do. |
| 167 | do | do | do | 4-chlorophenyl-1 | Do. |
| 168 | do | do | do | naphthyl-1 | Do. |
| 169 | do | hydrogen | methyl | phenyl | Do. |
| 170 | do | do | do | 4-methylphenyl-1 | Do. |
| 171 | do | do | do | 4-chlorophenyl-1 | Do. |
| 172 | do | methyl | do | do | Do. |
| 173 | do | do | do | phenyl | Do. |
| 174 | do | do | do | 4-methylphenyl-1 | Do. |
| 175 | do | hydrogen | ethyl | do | Do. |
| 176 | do | do | do | phenyl | Do. |
| 177 | do | do | do | 4-chlorophenyl-1 | Do. |
| 178 | do | methyl | do | do | Do. |
| 179 | do | do | do | naphthyl-2 | Do. |
| 180 | do | do | do | phenyl | Do. |
| 181 | do | do | do | 4-methylphenyl-1 | Do. |
| 182 | bromine | do | methyl | do | Do. |
| 183 | do | hydrogen | do | do | Do. |

In Table 5 a few water-insoluble monoazo dyestuffs are described. They correspond to the formula

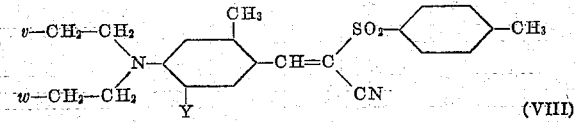

(VIII)

and are characterized by the symbols $v$, $w$ and Y in columns (I) to (III) and by the shade of spun-dyed cellulose acetate in column (IV).

Table 5

| Ex. No. | (I) v | (II) w | (III) Y | (IV) Shade of Spun-Dyed Cellulose Acetate |
|---|---|---|---|---|
| 184 | chlorine | hydrogen | methyl | greenish-yellow |
| 185 | do | do | ethyl | Do. |
| 186 | do | do | methoxy | Do. |
| 187 | do | do | ethoxy | Do. |
| 188 | propionoxy | propionoxy | do | Do. |
| 189 | do | do | ethyl | Do. |
| 190 | do | do | methyl | Do. |
| 191 | do | do | methoxy | Do. |

EXAMPLE 192

2 parts of the dyestuff produced as described in Example 7, 280 parts of post-chlorinated polyvinyl chloride and 10 parts of diearylsulfide are dissolved in 708 parts of acetone at 40°. The resultant mass is pumped into the spinning pot and extruded in the normal manner, the filament being precipitated with water. It is then orientated and dried at 40° to 70°. The shade is a greenish yellow.

EXAMPLE 193

A mixture of 1 part of the dyestuff obtained in accordance with Example 9, 199 parts of a copolymer composed of 60.1% of vinyl chloride and 39.9% parts of acrylonitrile, and 800 parts of acetone are mixed together for 4 hours at 50°. A homogeneous yellow solution is obtained which is filtered and spun into filament, using water as precipitant. The filament is orientated and seat-set in boiling water. The finished filament is of yellow shade and has good fastness properties.

EXAMPLE 194

165 parts of polyacrylonitrile and 1 part of the dyestuff obtained according to Example 11 are dissolved at 100° in 834 parts of dimethylformamide. The mass so formed is extruded from a spinnerette using the normal procedure for viscose rayon. The resulting filament is precipitated with water and orientated in a hot water bath at 90°. The spun-dyed filament is of bright yellow shade and possesses good fastness properties.

EXAMPLE 195

1 part of the dyestuff obtainable as specified in Example 12 and 179 parts of polyacrylonitrile are dissolved in 820 parts of dimethylformamide at 100°. These components form a paste which is extruded from a spinnerette into a bath of glycerol at 140°. The filament is reeled and orientated, washed with water to clear it of glycerol, and then dried. Greenish yellow shades of good all-round fastness are obtained.

EXAMPLE 196

25 parts of the dystuff obtainable according to Example 13 are mixed with 5000 parts of Rilsan and melted in the normal way in a nitrogen atmosphere at 230°. The thick liquid mass thus formed is spun into a greenish yellow filament which has good fastness properties.

EXAMPLE 197

25 parts of the dyestuff obtainable according to Example 14 are mixed with 5000 parts of nylon and melted in the normal way in a nitrogen atmosphere at about 285° to give a thick liquid mass which is spun into a greenish yellow filament. The filament has good fastness properties. It can be orientated and/or crimped and heat-set to render it shrinkproof.

EXAMPLE 198

25 parts of the dyestuff of the formula

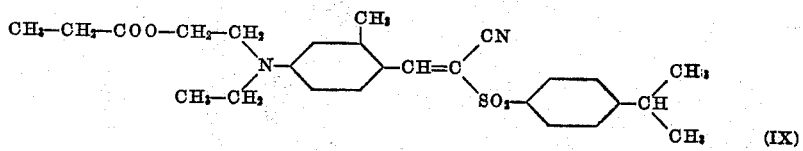

(IX)

are mixed with 5000 parts of a condensate of terephthalic acid and glycol or of the dimethyl ester of this acid and glycol. The mixture is melted in the normal manner in a nitrogen atmosphere at about 280°. The thick liquid mass forms a greenish yellow spun filament which possesses good fastness properties.

EXAMPLE 199

1 part of the dyestuff of the formula

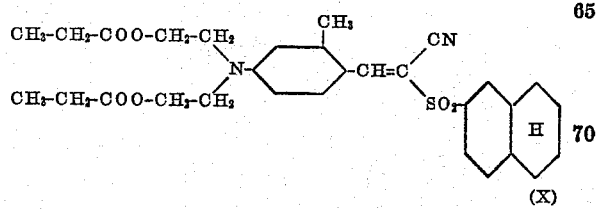

(X)

is mixed with 300 parts of polyethylene and spun by the normal extrusion method. Bright greenish yellow filaments or bristles are obtained. Polystyrene can be solution-dyed with this dyestuff in a similar manner.

Formulae of representative dyestuffs of the foregoing examples are

EXAMPLE 1

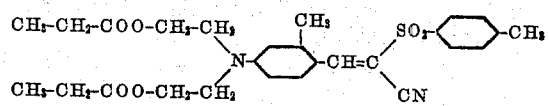

EXAMPLE 2

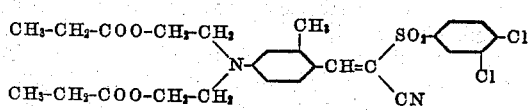

EXAMPLE 3

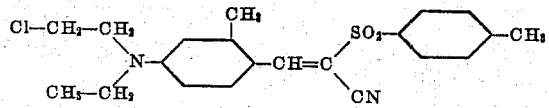

and

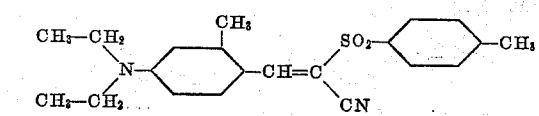

EXAMPLES 4 AND 5

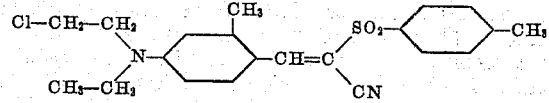

EXAMPLE 7

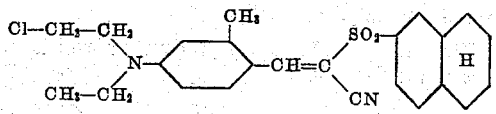

EXAMPLE 15

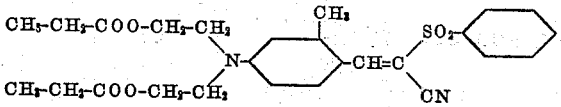

EXAMPLE 24

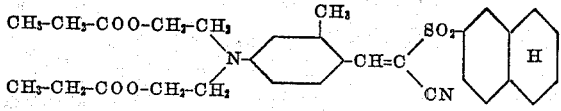

Having thus disclosed the invention what is claimed is:

1. A water-insoluble styryl dyestuff which corresponds to the formula

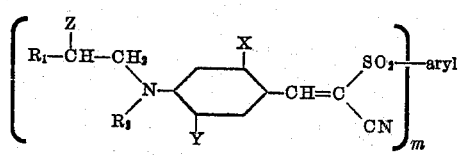

wherein $R_1$ represents a member selected from the group consisting of chlorine, bromine and the $R_3$—COO— radical, in which $R_3$ stands for a member chosen from the class consisting of methyl, ethyl, n-propyl, isopropyl, chloromethyl, methoxymethyl and ethoxymethyl, $R_2$ represents an alkyl radical containing 1 to 4 carbon atoms, when $R_1$ stands for a halogen atom as defined above, and represents a member selected from the group consisting of an alkyl radical containing 1 to 4 carbon atoms and the radical

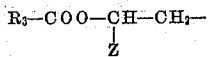

when $R_1$ stands for the radical $R_3$—COO,

X represents a member selected from the group consisting of methyl and ethyl,

Y represents a member selected from the group consisting of hydrogen, methyl, ethyl, methoxy and ethoxy.

Z represents a member selected from the group consisting of hydrogen and methyl, m represents one of the integers 1 and 2, and aryl represents a member selected from the group consisting of phenyl, halogenated phenyl, lower alkylphenyl, naphthyl and tetrahydronaphthyl.

2. A water-insoluble styryl dyestuff which corresponds to the formula

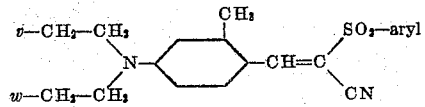

wherein v represents a member selected from the group consisting of chlorine and the propionoxy radical, w represents a member selected from the group consisting of hydrogen and the propionoxy radical, and aryl represents a member selected from the group consisiting of phenyl, halogenated phenyl, lower alkylphenyl, naphthyl and tetrahydronaphthyl.

3. The water-insoluble styryl dyestuff which corresponds to the formula

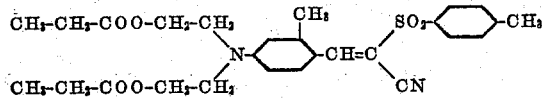

4. The water-insoluble styryl dyestuff which corresponds to the formula

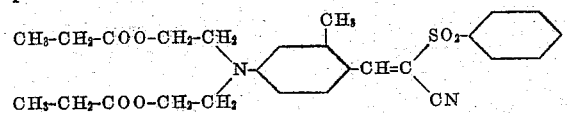

5. The water-insoluble styryl dyestuff which corresponds to the formula

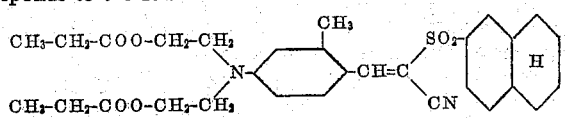

6. The water-insoluble styryl dyestuff which corresponds to the formula

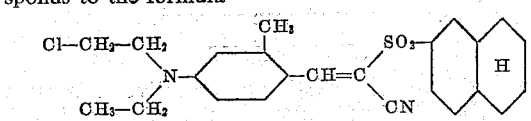

7. The water-insoluble styryl dyestuff which corresponds to the formula

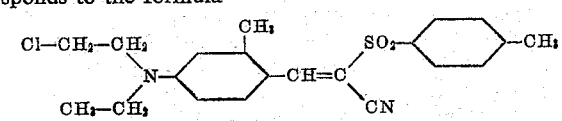

References Cited in the file of this patent

UNITED STATES PATENTS

| | | |
|---|---|---|
| 2,120,401 | Felix et al. | June 14, 1938 |
| 2,226,054 | Felix et al. | Dec. 24, 1940 |
| 2,583,551 | Dickey et al. | Jan. 29, 1952 |
| 2,583,614 | Taylor | Jan. 29, 1952 |
| 2,776,310 | Straley et al. | Jan. 1, 1957 |
| 2,850,520 | Merian et al. | Sept. 2, 1958 |